(12) United States Patent
Rui et al.

(10) Patent No.: US 8,644,799 B2
(45) Date of Patent: Feb. 4, 2014

(54) CHARGING SYSTEM AND METHOD

(75) Inventors: Tong Rui, Shenzhen (CN); Na Zhou, Shenzhen (CN); Zaifeng Zong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,664

(22) PCT Filed: Apr. 21, 2010

(86) PCT No.: PCT/CN2010/072006
§ 371 (c)(1),
(2), (4) Date: Feb. 2, 2012

(87) PCT Pub. No.: WO2010/145305
PCT Pub. Date: Dec. 23, 2010

(65) Prior Publication Data
US 2012/0142311 A1    Jun. 7, 2012

(30) Foreign Application Priority Data

Aug. 25, 2009 (CN) .......................... 2009 1 0169343
Nov. 12, 2009 (CN) .......................... 2009 1 0210957

(51) Int. Cl.
| | |
|---|---|
| *H04M 11/00* | (2006.01) |
| *H04M 3/00* | (2006.01) |
| *H04W 4/00* | (2009.01) |
| *H04B 7/00* | (2006.01) |
| *H04L 12/66* | (2006.01) |
| *G06F 15/16* | (2006.01) |

(52) U.S. Cl.
USPC ........ 455/406; 455/418; 455/433; 455/456.1; 370/352; 370/259; 370/338; 370/331; 370/310; 709/228; 709/400

(58) Field of Classification Search
USPC .......................................................... 455/406
See application file for complete search history.

(56) References Cited

U.S. PATENT DOCUMENTS 7,773,571 B1 * 8/2010 Maxwell et al. ............... 370/338
2007/0115861 A1 * 5/2007 Zhang et al. .................. 370/259
(Continued)

FOREIGN PATENT DOCUMENTS

| CN | 1601945 A | 3/2005 |
| CN | 1684420 A | 10/2005 |

(Continued)

OTHER PUBLICATIONS

International Search Report for PCT/CN2010/072006 dated Jul. 5, 2010.

*Primary Examiner* — Timothy Pham
(74) *Attorney, Agent, or Firm* — Ling Wu; Stephen Yang; Ling and Yang Intellectual Property

(57) ABSTRACT

The present invention provides a charging method, including: a mobility management network element obtaining charging policy information of a terminal from a user subscription data network element; an access network element obtaining the charging policy information of the terminal from the mobility management network element; and the access network element storing the charging policy information of the terminal, and charging for services of the terminal according to the charging policy information. Accordingly, the present invention also provides a charging system, an access network element and a mobility management network element. The technical scheme of the present invention can send the charging policy information to the radio side network element in the LIPA structure to realize the dynamic charging based on users of services; and it can cover the LTE network and the 3G network at the same time.

30 Claims, 6 Drawing Sheets

(56) References Cited

U.S. PATENT DOCUMENTS

| | | | |
|---|---|---|---|
| 2007/0165803 A1* | 7/2007 | Duan | 379/114.03 |
| 2008/0273523 A1 | 11/2008 | Menditto et al. | |
| 2009/0234956 A1* | 9/2009 | Wang et al. | 709/228 |
| 2010/0287079 A1* | 11/2010 | Cai et al. | 705/34 |
| 2012/0064878 A1* | 3/2012 | Castro Castro et al. | 455/418 |

FOREIGN PATENT DOCUMENTS

| | | |
|---|---|---|
| CN | 1716863 A | 1/2006 |
| CN | 1848741 A | 10/2006 |
| JP | 2009081902 A | 4/2009 |
| WO | 2008151544 A1 | 12/2008 |
| WO | 2008157266 A1 | 12/2008 |

* cited by examiner

CHARGING SYSTEM AND METHOD

TECHNICAL FIELD

The present invention relates to the mobile communication field, and particularly, to a charging system and a charging method.

BACKGROUND OF THE RELATED ART

The 3rd Generation Partnership Project (3GPP) Evolved Packet System (EPS) is composed of an Evolved Universal mobile communication system Terrestrial Radio Access Network (E-UTRAN), a Mobility Management Entity (MME), a Serving Gateway (S-GW), a Packet Data Network Gateway (P-GW or PDN GW), a Home Subscriber Server (HSS), an Authentication, Authorization and Accounting (AAA) server of 3GPP, a Policy and Charging Rules Function (PCRF) entity and other supporting nodes.

FIG. 1 is a schematic diagram of a system architecture of EPS. As shown in FIG. 1, the mobility management entity is responsible for the relative operations of the control plane such as mobility management, processing for non-access stratum signaling and management of user mobility management context; the S-GW is an access gateway device connected with the E-UTRAN, is used to forward data between the E-UTRAN and the P-GW, and is responsible for buffering the paging wait data; the P-GW is a border gateway between the EPS and the packet data network (PDN), is responsible for functions of the access of PDN and forwarding data between the EPS and the PDN, etc.; both the S-GW and the P-GW are belong to the core network gateway; the PCRF connects with the operator internet protocol (IP) service network through receiving interface Rx to obtain service information, and moreover, it connects with the gateway devices in the network through interfaces Gx, Gxa and Gxc, and is responsible for initiating establishment of IP bearer, guaranteeing the quality of service (QoS) of the service data and performing charging control.

The EPS supports intercommunication with a non-3GPP system, wherein, the intercommunication with the non-3GPP system is realized through interfaces S2a, S2b and S2c, and the P-GW acts as an anchor point between the 3GPP system and the non-3GPP system. In the system architecture diagram of EPS, the non-3GPP system is divided into a trusted non-3GPP IP access and an un-trusted non-3GPP IP access. The trusted non-3GPP IP access can connect with the P-GW through the S2a interface; and the un-trusted non-3GPP IP access needs to connect with the P-GW through an evolved packet data gateway (ePDG), and the interface between the ePDG and the P-GW is S2b. S2c provides control related to the user plane and mobility support between the user equipment (UE) and the P-GW, the supporting mobility management protocol is a mobile IPv6 support for dual stack hosts and routers (DSMIPv6).

In the EPS system, a policy and charging enforcement function (PCEF for short) entity exists in the P-GW, and information is exchanged between the PCRF and the P-GW through a Gx interface (see FIG. 1). When the interface between the P-GW and the S-GW is based on PMIPv6, the S-GW has a bearer binding and event report function (BBERF) entity to perform the QoS control on the service data stream, and the information is exchanged between the S-GW and the PCRF through a Gxc interface (see FIG. 1). When accessing by the trusted non-3GPP access system, the BBERF also residents in the trusted non-3GPP access gateway. The information is exchanged between the trusted non-3GPP access gateway and the PCRF through the Gxa interface (see FIG. 1). When the UE is roaming, a interface S9 is the interface of a home PCRF and a visit PCRF, meanwhile an application function (AF) of providing services for the UE sends the service information used for constituting a policy and charging control (PCC) strategy to the PCRF through the interface Rx. In the 3GPP, the corresponding PDN network can be found by an access point name (APN). One connection from the UE to the PDN network is usually called as an IP connectivity access network (IP-CAN) session. During establishing the IP-CAN session, Diameter sessions are established respectively between the BBERF and the PCRF and between the PCEF and the PCRF, information, such as the policy charging information and the information used to constitute the policy, etc., used for controlling the IP-CAN session is transported by these Diameter sessions.

Home eNodeB (H(e)NB) is a small, low power base station deployed in indoor places such as home and office, the main action is to provide higher service rate for users and reduce cost required for using the high rate service, and meanwhile it compensates coverage shortage of the existing distributed cell wireless communication system. The advantages of the H(e)NB are economy, convenience, low power output and plug and play, and so on. In the H(e)NB system, the H(e)NB is a network element of radio side.

Local IP Access (LIPA) is a technology proposed in H(e)NB research, as shown in FIG. 2. With LIPA technology, the local access by the terminal to other IP devices in the home area network of user and the intranet or the Internet can be realized, while the data stream does not need to cross the core network deployed by the operator. The local IP access can be realized by multiple connection establishment ways: by establishing a connection to realize the core network access and local IP access function at the same time (as shown in FIG. 2a and FIG. 2b), in which there is no need to add the function of local gateway to the radio side network element or the H(e)NB gateway, wherein the local access gateway, as the network of the local place accessing to the external network (such as internet), provides functions such as: address assignment, charging, packet filtering, strategy controlling, data distribution function, radio access network application part (NAS or RANAP) message parsing, network address translation (NAT) and local IP access strategy routing and enforcing, and so on; and, by adding the local gateway to provide strong support for the local IP access technology, the local gateway can be combined-set with the radio side network element (as shown in FIG. 2c). In the case that there is a H(e)NB gateway, the local gateway can not only be combined-set with the H(e)NB, but also can be combined-set with the H(e)NB gateway (as shown in FIG. 2d). The local gateway can be a local serving gateway (L-SGW) and a local packet data network (PDN) gateway (L-PGW), or can be a single L-PGW, or can be a data distribution function entity. Additionally, the H(e)NB gateway can be combined-set with the H(e)NB. For the universal terrestrial radio access network (UTRAN) system, the core network gateway can be a serving general packet radio service (GPRS) support node (SGSN), or a gateway PFRS support node (GGSN). The local gateway can be a local GGSN (L-GGSN) and a local SGSN (L-SGSN), or can be a single L-GGSN. For describing conveniently, and no matter for which way, the related network elements for establishing the LIPA connection include the radio side network element, the H(e)NB gateway and the local gateway, wherein the radio side network element, the H(e)NB gateway and the local gateway are belong to the network elements at which the UE is located when establishing the LIPA connection, which are called as the network elements at which the UE is located.

Because the data stream does not need to pass through the user plane channel of the core network, thereby decreasing the data flow load of the core network, so that not only the operator can provide services for the users by the more effective way, but also the user experience can be improved at the same time.

CONTENT OF THE INVENTION

In the LIPA architecture, if charging for the data stream flowing into the radio side network element and the H(e)NB gateway is needed, then it is also needed to provide a technical scheme for realizing the charging.

The technical problem to be solved by the present invention is to provide a charging system, a charging method and a corresponding access network element and mobility management network element, which are able to issue charging policy information to the access network element in the LIPA architecture, to realize the charging.

In order to solve the above-mentioned problem, the present invention provides a charging method, and the method comprises:

a mobility management network element obtaining charging policy information of a terminal from a user subscription data network element;

an access network element obtaining the charging policy information of the terminal from the mobility management network element; and the access network element storing the charging policy information of the terminal, and charging for services of the terminal according to the charging policy information.

The access network element is one or more of: a radio side network element, a home eNodeB gateway and a local gateway;

the mobility management network element is one of: a mobility management entity (MME), a mobile switching centre and a serving general packet radio service (GPRS) support node (SGSN); and the user subscription data network element is one of: a home subscriber server (HSS), a subscription profile repository (SPR) and a home location register (HLR).

Before the step of the mobility management network element obtaining the charging policy information of the terminal, the method further comprises: the mobility management network element, when receiving an attaching request initiated by the access network element, obtaining from the attaching request an identification of the terminal which initiates the attaching request to the access network element;

when the access network element includes a radio side network element and the local gateway, and the radio side network element and the local gateway are deployed separately, the local gateway receives and stores the charging policy information of the terminal, and charges for the services of the terminal according to the charging policy information; wherein, the local gateway is a data distribution function entity.

In the step of the mobility management network element obtaining the charging policy information of the terminal, the mobility management network element obtains the charging policy information corresponding to the identification.

The method further comprises: when the charging policy information is updated, the mobility management network element sending an updating request message to the access network element, wherein the updating request message carries an updated charging policy information and an identification of the terminal corresponding to the updated charging policy information;

after the access network element receives the updating request message, updating the locally stored charging policy information of the terminal by the updated charging policy information.

The method further comprising: when a terminal leaves the access network element, the mobility management network element notifying the access network element to delete the charging policy information of the leaving terminal;

the access network element deleting the charging policy information of the leaving terminal according to the notification of the mobility management network element.

The step of the mobility management network element obtaining the charging policy information of the terminal from the user subscription data network element comprises:

performing a security authentication between the mobility management network element and the user subscription data network element, and after the authentication succeeds, the mobility management network element sending an updating location message to the user subscription data network element, wherein the updating location message carries the identification of the terminal and requests the charging policy information corresponding to the identification of the terminal;

the user subscription data network element querying the charging policy information of the terminal in the stored charging policy information, and returning a response message carrying the charging policy information to the mobility management network element.

The charging policy information is one or more of: offline charging information, online charging information, charging granularity and charging rate.

The radio side network element is one or more of: a base station, a home eNodeB and a radio network controller (RNC); and the local gateway is one or more of: a local serving gateway (L-SGW), a local packet data network gateway (L-PGW) and a data distribution function entity.

The present invention provides a charging system, comprising: an access network element, a mobility management network element and a user subscription data network element; wherein, the user subscription data network element is configured to: store charging policy information of a terminal;

the mobility management network element is configured to: obtain the charging policy information of the terminal from the user subscription data network element, and send the obtained charging policy information to the access network element; and the access network element is configured to: obtain the charging policy information of the terminal from the mobility management network element, store the charging policy information of the terminal, and charge for services of the terminal according to the charging policy information.

The access network element is one or more of: a radio side network element, a home eNodeB gateway and a local gateway;

the mobility management network element is one of: a mobility management entity (MME), a mobile switching centre and a serving general, packet radio service (GPRS) support node (SGSN);

the user subscription data network element is one of: a home subscriber server (HSS), a subscription profile repository and a home location register (HLR); and the charging policy information is one or more of: offline charging information, online charging information, charging granularity and charging rate.

The access network element is further configured to: receive an attaching request initiated by the terminal and send the attaching request to the mobility management network element; and the mobility management network element is further configured to: when receiving the attaching request initiated by the access network element, obtain from the attaching request an identification of the terminal which initiates the attaching request to the access network element, and then obtain the charging policy information corresponding to the identification from the user subscription data network element.

The mobility management network element is further configured to: send an updating request message to the access network element when the charging policy information is updated, wherein the updating request message carries an updated charging policy information and an identification of the terminal corresponding to the updated charging policy information;

the access network element is further configured to: when receiving the updating request message, update the locally stored charging policy information of the terminal by the updated charging policy information.

The mobility management network element is further configured to: when there is a terminal leaving the access network element, notify the access network element to delete the charging policy information of the leaving terminal;

the access network element is further configured to: delete the charging policy information of the leaving terminal according to the notification of the mobility management network element.

The mobility management network element is configured to obtain the charging policy information of the terminal from the user subscription data network element according to the following way of:

performing a security authentication between the mobility management network element and the user subscription data network element, and after the authentication succeeds, sending an updating location message to the user subscription data network element, wherein the updating location message carries the identification and requests the charging policy information corresponding to the identification;

the user subscription data network element is configured to: perform the security authentication with the mobility management network element, and after the authentication succeeds, query the charging policy information corresponding to the identification in the stored charging policy information.

The radio side network element comprises one or more of a base station, a home eNodeB and a radio network controller (RNC), and the local gateway is one or more of: a local serving gateway (L-SGW), a local packet data network gateway (L-PGW) and a data distribution function entity.

The present invention also provides an access network element, comprising an obtaining module, a storage module and a charging module, wherein:

the obtaining module is configured to: obtain from a mobility management network element charging policy information of a terminal which is obtained from a home user subscription data network element by the mobility management network element;

the storage module is configured to: store the charging policy information of the terminal obtained by the obtaining module; and the charging module is configured to: charge for services of the terminal according to the charging policy information stored in the storage module.

The access network element is one or more of: a radio side network element, a home eNodeB gateway and a local gateway.

The obtaining module is further configured to: receive an updating request message sent by the mobility management network element when the charging policy information is updated, and obtain an updated charging policy information carried in the updating request message; and the storage module is configured to: update the locally stored charging policy information of the terminal by the updated charging policy information.

The access network element further comprises:

a notification forwarding module, which is configured to: receive a notification of deleting charging policy information of a leaving terminal sent by the mobility management module when a terminal leaves the access network element, and forward the notification of deleting the charging policy information of the leaving terminal to the storage module; and the storage module is further configured to: delete the charging policy information of the leaving terminal according to the notification of deleting the charging policy information of the leaving terminal.

The radio side network element is one or more of: a base station, a home eNodeB and a radio network controller (RNC); and the local gateway is one of more of: a local serving gateway (L-SGW), a local packet data network gateway (L-PGW) and a data distribution function entity.

The present invention also provides a mobility management network element, comprising a charging policy information obtaining module and a sending module, wherein, the charging policy information obtaining module is configured to: obtain charging policy information of a terminal from a user subscription data network element; and the sending module is configured to: send the obtained charging policy information to an access network element, so that the access network element obtains from the mobility management network element and stores the charging policy information of the terminal, and charges for services of the terminal according to the charging policy information.

The mobility management network element is one of: a mobility management entity (MME), a mobile switching centre and a serving general packet radio service (GPRS) support node (SGSN).

The charging policy information obtaining module is further configured to: when receiving an attaching request which is initiated by the terminal and sent by the access network element, obtain from the attaching request an identification of the terminal which initiates an attaching request to the access network element, and obtain the charging policy information corresponding to the identification from the user subscription data network element.

The charging policy information obtaining module is further configured to: when the charging policy information is updated, send an updating request message to the access network element, wherein the updating request message carries an updated charging policy information and an identification of the terminal corresponding to the updated charging policy information, so that the access network element updates the locally stored charging policy information of the terminal by the updated charging policy information.

The charging policy information obtaining module is further configured to: when a terminal leaves the access network element, notify the access network element to delete the charging policy information of the leaving terminal, so that the access network element deletes the charging policy information of the leaving terminal according to the notification of the mobility management network element.

The charging policy information obtaining module is configured to obtain the charging policy information of the terminal from the user subscription data network element by the following ways of: performing a security authentication between the mobility management network element and the user subscription data network element, and after the authentication succeeds, sending an updating location message to the user subscription data network element, wherein the updating location message carries the identification and requests the charging policy information corresponding to the identification; and the user subscription data network element is configured to: perform the security authentication with the mobility management network element, and after the authentication succeeds, query the charging policy information corresponding to the identification in the stored charging policy information.

The technical scheme is able to issue the charging policy information to radio side network element in the LIPA architecture, to realize the dynamic charging based on the users or services; and to cover the LTE network and the 3G network at the same time.

BRIEF DESCRIPTION OF DRAWINGS

The description of drawings is used to provide a further understanding of the present invention, and is a part of the specification, and is used to explain the present invention with the embodiments of the present invention together, and does not constitute limitation to the present invention. In the drawings.

PREFERRED EMBODIMENTS OF THE PRESENT INVENTION

Figure 1:
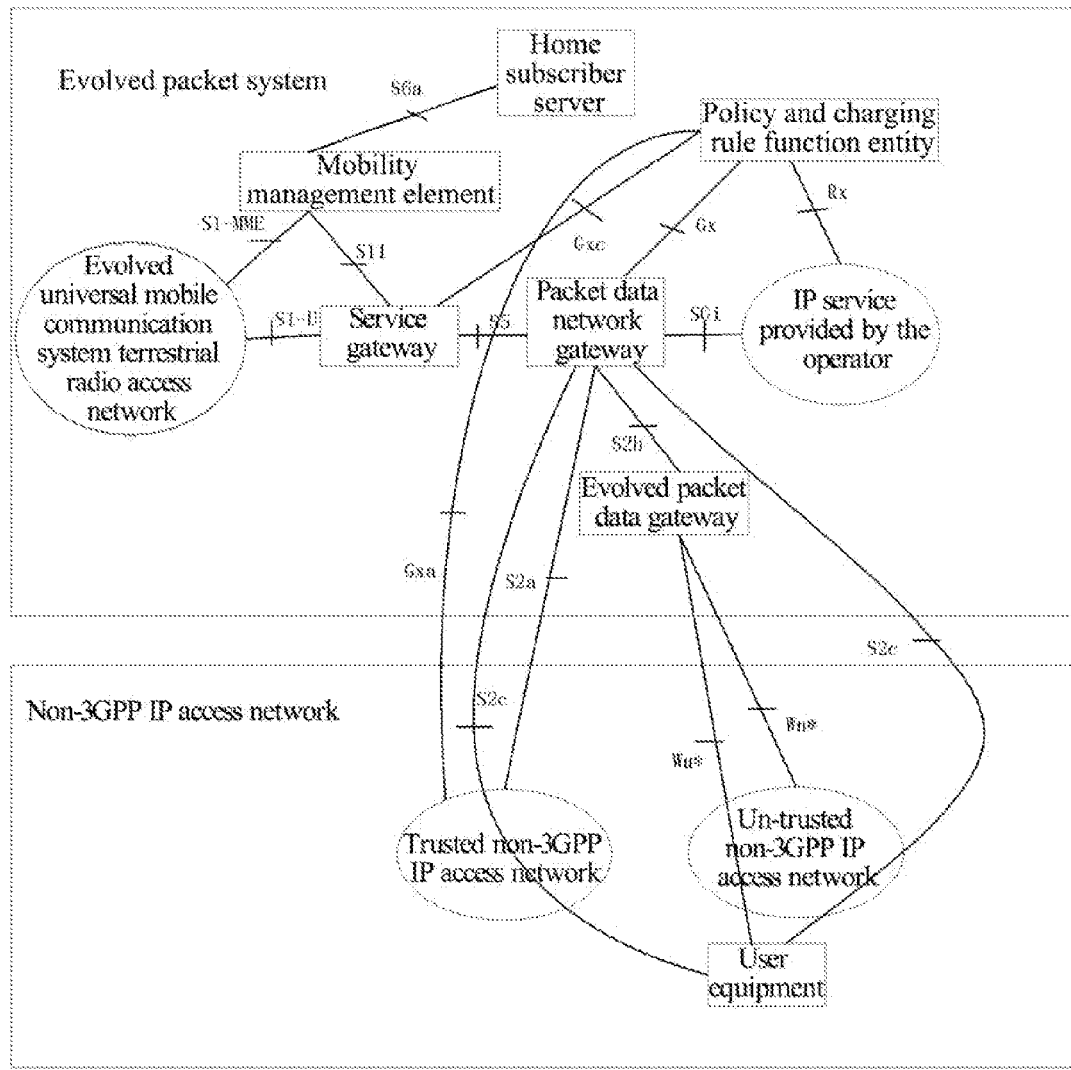
FIG. 1 is a schematic diagram of a system architecture of EPS.
Figure 2:
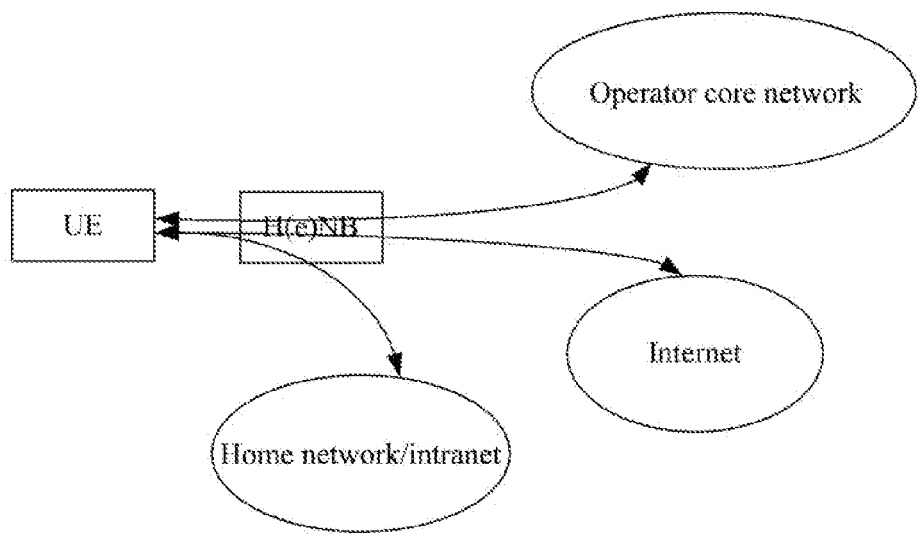
FIG. 2, FIG. 2a, FIG. 2b, FIG. 2c and FIG. 2d are schematic diagrams of data stream in the LIPA technology.
Figure 2A:
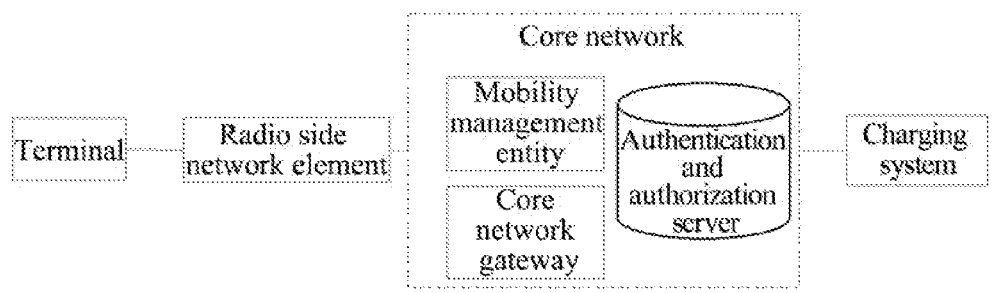
Figure 2B:
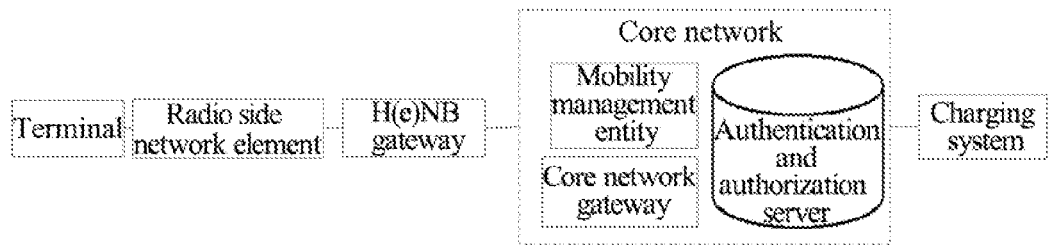
Figure 2C:
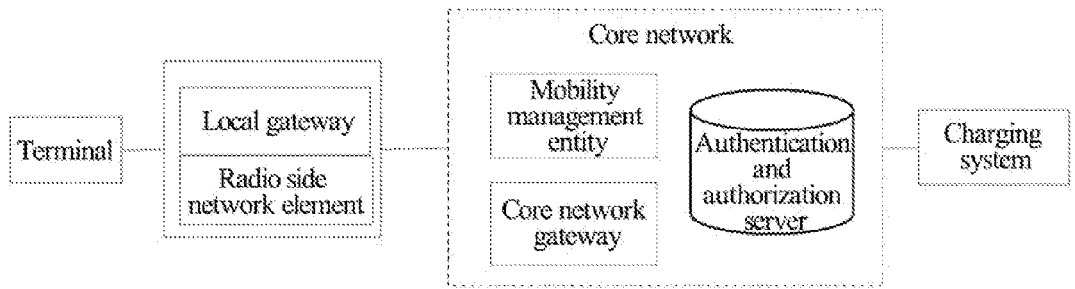
Figure 2D:
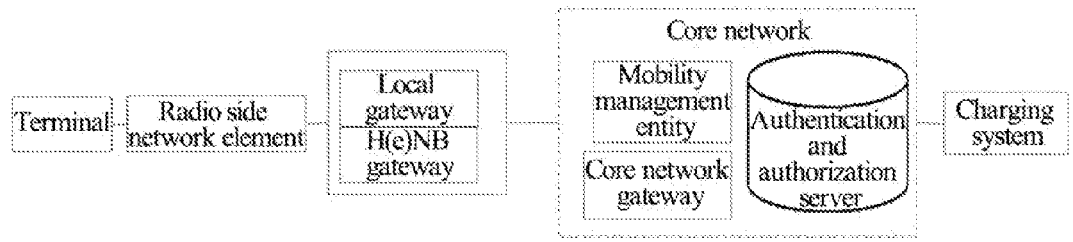

The technical scheme of the present invention will be further described in detail in combination with the accompanying drawings and the specific embodiments, to allow those skilled in the art to understand and implement the present invention better, however the exemplary embodiments do not act as the limitation to the present invention.

The design of the present invention is based on the following idea:

In an LIPA architecture, if it is needed to charge for the data stream that flows into an access network element such as a radio side network element and a H(e)NB gateway, then the access network element needs to obtain charging policy information; and the present invention proposes a technical scheme of how the access network element obtaining the charging policy information in the LIPA architecture, which is acted as an implementation basis of dynamically charging in the LIPA architecture.

Embodiment 1

A method for charging in a charging system includes:

a mobility management network element, when receiving an attaching request initiated by an access network element (e.g., radio side network element), obtaining from the attaching request an identification of a terminal which initiates an attaching request to the radio side network element, and then obtaining charging policy information corresponding to the identification from a user subscription data network element;

the mobility management network element issuing the obtained charging policy information to the access network element;

after the access network element receives the charging policy information, storing the charging policy information as the charging policy information corresponding to the terminal, and charging for the subsequent services of the terminal according to the charging policy information.

In this embodiment, the access network element is one or a combination of more of: a radio side network element, a H(e)NB gateway and a local gateway;

the radio side network element is any one or more of: a base station, a H(e)NB and a radio network controller (RNC), and so on;

the local gateway is one or more of: a local serving gateway (L-SGW), a local packet data network gateway (L-PGW) and a data distribution function entity.

The mobility management network element is any one of: a mobility management entity (MME), a mobile switching centre (MSC) and a serving GPRS support node (SGSN), and so on.

The user subscription data network element is one of: an HSS, a subscription profile repository (SPR) and a home location register (HLR).

In this embodiment, the charging policy information corresponding to different identifications is stored in the user subscription data network element; the charging policy information stored in the user subscription data network element can be one to one correspondence with the different identifications, and the user subscription data network element can query the charging policy information corresponding to each identification; the charging policy information stored in the user subscription data network element can correspond to user groups, and the user subscription data network element can confirm the user group to which it belongs according to the identification, thereby obtaining the charging policy information corresponding to the identification; and in the practical application, other ways for storage should not be ruled out.

In this embodiment, the method can further include:

when the charging policy information is updated, the mobility management network element sending an updating request message to the access network element, wherein the updating request message carries the updated charging policy information and the identification of the terminal corresponding to updated charging policy information;

the access network element, after receiving the updating request message, updating the corresponding charging policy information of the terminal stored locally by the updated charging policy information, and charging for the subsequent services of the corresponding terminal according to the updated charging policy information;

in this embodiment, the mobility management network element can update the charging policy information according to its own configuration, or, the user subscription data network element can update the charging policy information according to the user subscription information or configuration, and then the mobility management network element updates the charging policy information after receiving a notification from the user subscription data network element.

In this embodiment, the method can further include:

when a terminal leaves the access network element, the mobility management network element notifying the access network element to delete the charging policy information of the terminal;

the access network element deleting the charging policy information of the corresponding terminal according to the notification of the mobility management network element.

In this embodiment, the charging policy information can include but not limit to any one or more of the following information:

offline and/or online charging information;
charging granularity (including: flow and/or duration);
charging rate, and the like.

In the practical application, other information can also be included as needed.

In this embodiment, the step of the mobility management network element obtaining the charging policy information corresponding to the identification from the user subscription data network element can specifically include the following steps of:

performing a security authentication between the mobility management network element and the user subscription data network element, after the authentication succeeds, sending an updating location message to the user subscription data network element, wherein the updating location message carries the identification and requests the charging policy information corresponding to the identification;

the user subscription data network element querying the charging policy information corresponding to the identification in the stored charging policy information, and returning a response message carrying the charging policy information to the mobility management network element.

Accordingly, the present invention further provides an access network element, including an obtaining module, a storage module and a charging module, wherein:

the obtaining module is configured to: obtain from the mobility management network element the charging policy information of the terminal obtained from the user subscription data network element by the mobility management network element;

the storage module is configured to: store the charging policy information of the terminal obtained by the obtaining module; and the charging module is configured to: charge for the services of the terminal according to the charging policy information stored by the storage module.

The obtaining module is further configured to: receive the updating request message sent by the mobility management network element when the charging policy information is updated, and obtain the updated charging policy information carried in the updating request message; and the storage module is further configured to: update the locally stored charging policy information of the terminal by the updated charging policy information.

The access network element further includes:

a notification forwarding module, which is configured to: receive a notification of deleting the charging policy information of the leaving terminal sent by the mobility management network element when a terminal leaves the access network element, and forward the notification of deleting the charging policy information of the leaving terminal to the storage module; and the storage module is further configured to: delete the charging policy information of the leaving terminal according to the notification of deleting the charging policy information of the leaving terminal.

Wherein, the access network element is one or the combination of more of: a radio side network element, a H(e)NB gateway and a local gateway;

the radio side network element is any one or more of: a base station, a H(e)NB and a radio network controller (RNC), and so on;

the local gateway is one of more of: a local serving gateway (L-SGW), a local packet data network gateway (L-PGW) and a data distribution function entity.

The present invention also provides a mobility management network element, including a charging policy information obtaining module and a sending module, wherein, the charging policy information obtaining module is configured to: obtain the charging policy information of the terminal from the user subscription data network element; and the sending module is configured to: send the obtained charging policy information to the access network element, so that the access network element obtains from the mobility management network element and stores the charging policy information of the terminal, and charges for the services of the terminal according to the charging policy information.

The mobility management network element is one or more of: a mobility management entity (MME), a mobile switching centre, a serving general packet radio service (GPRS) support node (SGSN).

The charging policy information obtaining module is further configured to: when receiving the attaching request which is initiated by the terminal and sent by the access network element, obtain from the attaching request the identification of the terminal which initiates the attaching request to the access network element, and obtain the charging policy information corresponding to the identification from the user subscription data network element.

The charging policy information obtaining module is further configured to: when the charging policy information is updated, send the updating request message to the access network element, wherein the updating request message carries the updated charging policy information and the identification of the terminal corresponding to the updated charging policy information, so that the access network element updates the locally stored charging policy information of the terminal by the updated charging policy information.

The charging policy information obtaining module is further configured to: when a terminal leaves the access network element, notify the access network element to delete the charging policy information of the leaving terminal, so that the access network element deletes the charging policy information of the leaving terminal according to the notification of the mobility management network element.

The charging policy information obtaining module is configured to obtain the charging policy information of the terminal from the user subscription data network element by the following way of: performing a security authentication between the mobility management network element and the user subscription data network element, and after the authentication succeeds, sending an updating location message to the user subscription data network element, wherein the updating location message carries the identification and requests the charging policy information corresponding to the identification; and receiving the charging policy information corresponding to the identification returned by the user subscription data network element.

The embodiment will be further described by the following several application examples.

Application example 1, the radio side network element is the H(e)NB, and the mobility management network element is the MME, in this example.

When the UE attaches to an evolved packet core (EPC) network, and after the security authentication is completed, the MME can obtain the user subscribed charging policy information from the user subscription data network element, wherein the information includes related charging policy information such as: the offline and/or online charging information, the charging granularity (including flow and/or duration) and the charging rate, and the like.

The MME sends this information to the H(e)NB, after the H(e)NB receives installs and then charges correspondingly for the subsequent services of the UE.

Figure 3:
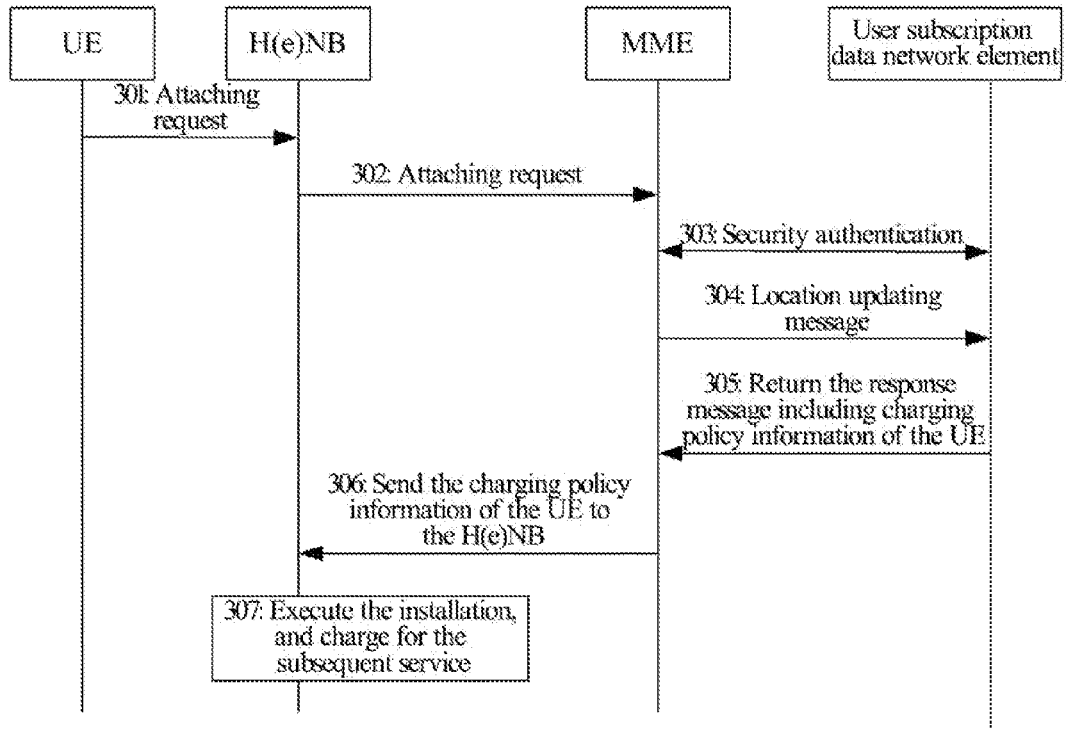
FIG. 3 is a flowchart of application example 1.

The specific steps are shown in FIG. 3:

301, the UE attaches to the EPC network, and initiates the attaching request carrying the identification of the UE to the H(e)NB;

302, the H(e)NB initiates the attaching request carrying the identification of the UE to the MME;

303, the MME initiates the security authentication to the user subscription data network element regarding to the validity of the UE accessing the EPC network.

304, after the security authentication is valid, the MME initiates the location updating message to the user subscription data network element, wherein the message includes the request for the charging policy information of the UE.

305, the user subscription data network element returns the response message to the MME, wherein the response message carries the user subscribed charging policy information of the UE, including the related charging policy information such as: the offline and/or online charging information, the charging granularity (including: flow and/or duration), the charging rate, and so on.

306, the MME sends the charging policy information of the UE to the H(e)NB, wherein the information includes the related charging policy information such as: the offline and/or online charging information, the charging granularity (including: flow and/or duration), the charging rate, and so on.

307, when the radio side network element is combined-set with the local gateway, the H(e)NB, after receiving, installs the charging policy information, and realizes the corresponding charging for the subsequent services of the UE; when the radio side network element and local gateway are deployed separately, the local gateway is deployed between the radio side network element and the mobility management network element, and the local gateway can receive and store the charging policy information, and realizes the corresponding charging for the subsequent services. Wherein, the local gateway now can be a data distribution function entity.

Application example 2, the radio side network element is the H(e)NB, and the mobility management network element is the MME, in this example.

When the MME acquires that some one or more charging policy information change (which can be from a notification of the user subscription data network element, or can be acquired by actively querying or other ways), the MME sends the updating request message to the H(e)NB, wherein the updating request message carries the updated charging policy information including the related charging policy information such as: the offline and/or online charging information, the charging granularity (including flow and/or duration) and the charging rate, and the like.

The H(e)NB, after receiving the updating request message, returns the response message to the MME, installs the updated charging policy information, and charges correspondingly for the subsequent services.

Figure 4:
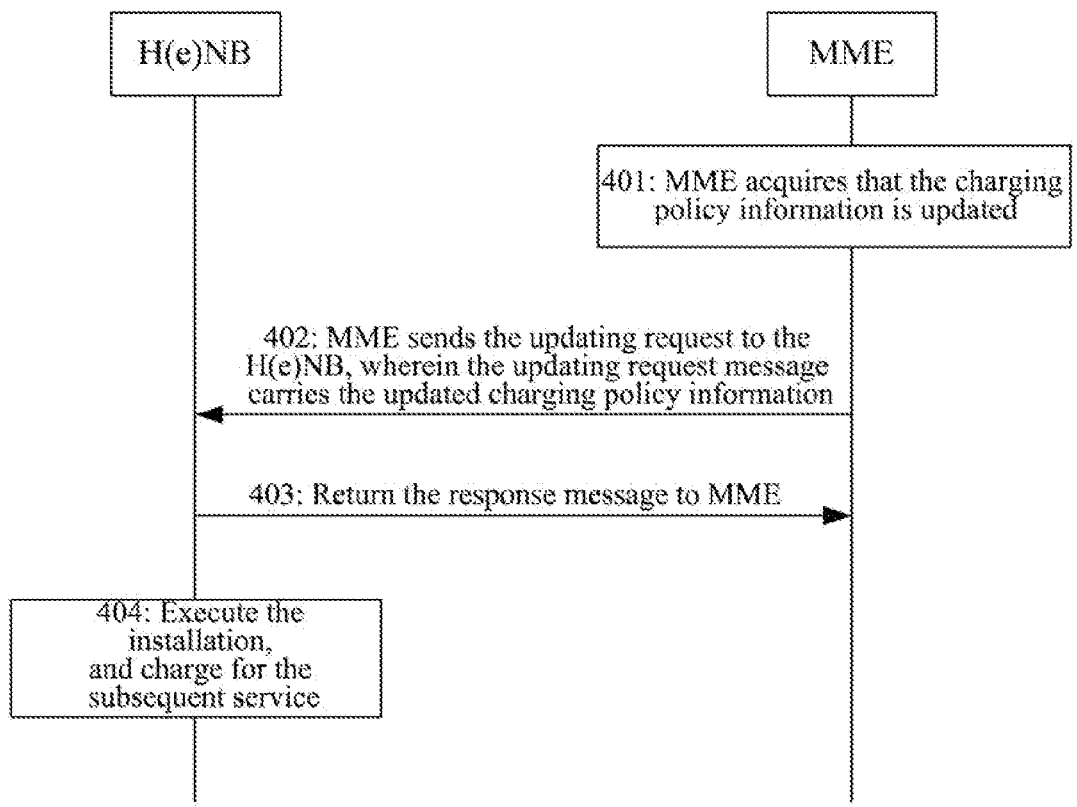
FIG. 4 is a flowchart of application example 2.

The specific steps are shown in FIG. 4:

401, the MME acquires that the related charging policy which the user subscribes changes (probably from the notification of the user subscription data network element);

402, the MME sends the updating request to the H(e)NB, wherein the updating request message carries the updated charging policy information, including the related charging policy information such as: the offline and/or online charging information, the charging granularity (including flow and/or duration) and the charging rate, and the like; and carries the identification of the terminal corresponding to the updated charging policy information;

403, the H(e)NB, after receiving the updating request message, returns the response message to the MME;

404, the H(e)NB installs the updated charging policy information, and charges correspondingly for the subsequent services of the corresponding terminal according to the updated charging policy information.

Application example 3, the radio side network element is the H(e)NB, and the mobility management network element is the MME, in this example.

When the MME acquires that a certain UE leaves from the H(e)NB (for example, the cases of switching between the base stations or leaving the network, and so on), the MME notifies the H(e)NB to delete the charging policy information corresponding to the UE, the H(e)NB, after receiving the message, deletes the charging policy information of the UE installed locally, and returns the response message to the MME.

Figure 5:
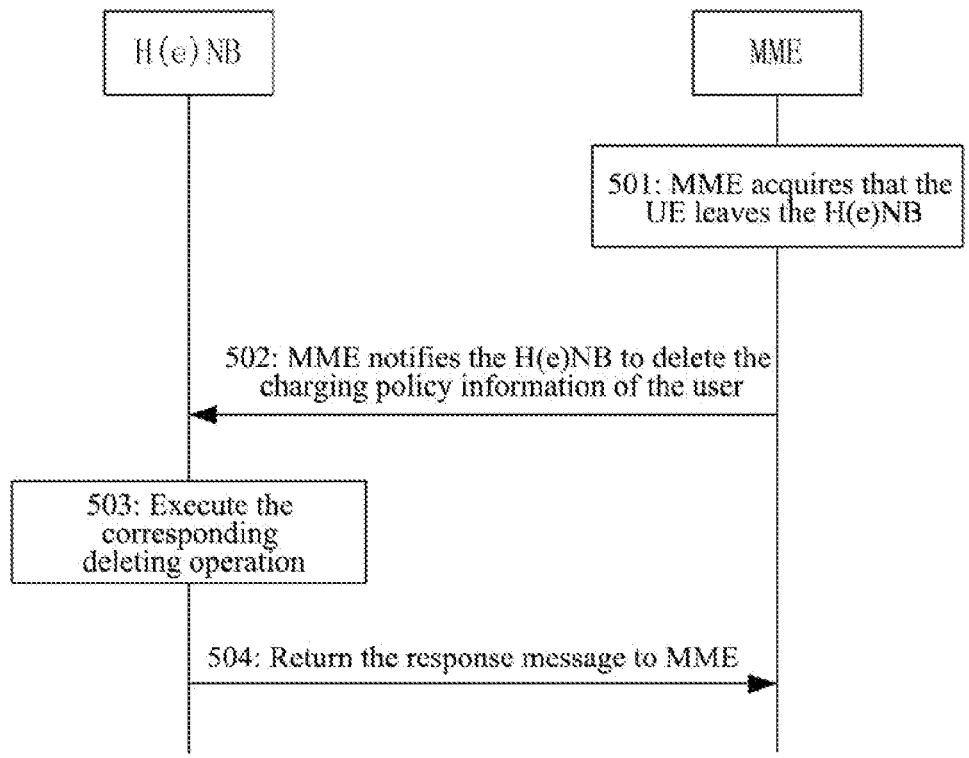
FIG. 5 is a flowchart of application example 3.

The specific steps are as shown in FIG. 5:

501, the MME acquires that a certain UE leaves from the H(e)NB (e.g., the cases of switching between the base stations or leaving the network, and so on);

502, the MME notifies the H(e)NB to delete the charging policy information of the UE;

503, the H(e)NB, after receiving the message, deletes the charging policy information of the UE installed locally;

504, the H(e)NB returns the response message to the MME.

Figure 9:
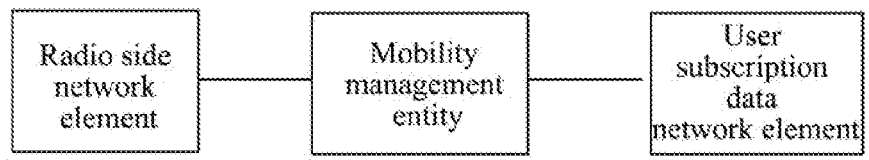
FIG. 9 is a schematic diagram 1 of a charging system.

Embodiment 2, a charging system, as shown in FIG. 9, comprises:

a user subscription data network element, which is configured to: store charging policy information;

a mobility management network element, which is configured to: when receiving an attaching request initiated by a radio side network element, obtain from the attaching request an identification of a terminal which initiates the attaching request to the radio side network element, and then obtain the charging policy information corresponding to the identification from the user subscription data network element, and issue to the radio side network element; and the radio side network element, which is configured to receive the attaching request initiated by the radio side network element, receive the charging policy information and store as the charging policy information corresponding to the terminal; and charge correspondingly for the subsequent services of the terminal according to the charging policy information.

In this embodiment, the mobility management network element is further configured to: when the charging policy information is updated, send an updating request message to the radio side network element, wherein the updating request message carries the updated charging policy information and the identification of the terminal corresponding to the updated charging policy information;

accordingly, the radio side network element is further configured to: receive the updating request message, update the locally stored charging policy information of the corresponding terminal by the updated charging policy information, and charge for the subsequent services of the corresponding terminal according to the updated charging policy information.

In this embodiment, the mobility management network element can update the charging policy information according to its own configuration, or the user subscription data network element can update the charging policy information according to the user subscription information or configuration, and then notify the mobility management to update the charging policy information.

In this embodiment, the mobility management network element is further configured to: when a terminal leaves the radio side network element, notify the radio side network element to delete the charging policy information of the terminal;

the radio side network element is further configured to: delete the charging policy information of the corresponding terminals according to the notification of the mobility management network element.

In this embodiment, the charging policy information can include but not limit to any one or more of the following information:

offline and/or online charging information;
charging granularity (including: flow and/or duration);
charging rate, and so on.

In the practical application, other information can also be included as needed.

In this embodiment, the mobility management network element is configured to obtain the charging policy information corresponding to the identification from the user subscription data network element according to the following way of:

performing a security authentication between the mobility management network element and the user subscription data network element, and after the authentication succeeds, sending an updating location message to the user subscription data network element, wherein the updating location message carries the identification and requests the charging policy information corresponding to the identification; and receiving a response message carrying the charging policy information corresponding to the identification returned by the user subscription data network element;

the user subscription data network element is further configured to: query the charging policy information corresponding to the identification in the stored charging policy information, and return the response message carrying the charging policy information to the mobility management network element.

Embodiment 3, a method for charging in a charging system includes:

a mobility management network element, when receiving an attaching request initiated by a local gateway and/or a H(e)NB gateway, obtaining from the attaching request an identification of a terminal which initiates the attaching request to the local gateway and/or the H(e)NB gateway, and then obtaining the charging policy information corresponding to the identification from the user subscription data network element;

the mobility management network element issuing the obtained charging policy information to the local gateway and/or the H(e)NB gateway;

the local gateway and/or the H(e)NB gateway, after receiving the charging policy information, storing the charging policy information as the charging policy information corresponding to the terminal, and charging correspondingly for the subsequent services of the terminal according to the charging policy information.

In this embodiment, the local gateway and/or the H(e)NB gateway includes any one or more of: a base station, a H(e)NB, a radio network controller (RNC), and so on;

the mobility management network element includes any one or more of: a mobility management entity (MME), a mobile switching centre (MSC), a serving GPRS support node (SGSN), and so on.

In this embodiment, the charging policy information corresponding to different identifications is stored in the user subscription data network element; the charging policy information stored in the user subscription data network element can be one to one correspondence with the different identifications, and the user subscription data network element can query the charging policy information corresponding to each identification; the charging policy information stored in the user subscription data network element can correspond to user groups, and the user subscription data network element can confirm the user group to which it belongs according to the identification, thereby obtaining the charging policy information corresponding to the identification; and in the practical application, other ways for storage should not be ruled out.

In this embodiment, the method can further include:

when the charging policy information is updated, the mobility management network element sending an updating request message to the local gateway and/or the H(e)NB gateway, wherein the updating request message carries the updated charging policy information and the identification of the terminal corresponding to the updated charging policy information;

the local gateway and/or the H(e)NB gateway, after receiving the updating request message, updating the locally stored charging policy information of the corresponding terminal by the updated charging policy information, and charging for the subsequent services of the corresponding terminal according to the updated charging policy information;

in this embodiment, the mobility management network element can update the charging policy information according to its own configuration, or it also can be that the user subscription data network element updates the charging policy information according to the user subscription information or configuration, and the mobility management network element updates the charging policy information after receiving the notification of the user subscription data network element.

In this embodiment, the method can further include:

when a terminal leaves the local gateway and/or the H(e)NB gateway, the mobility management gateway notifies the local gateway and/or the H(e)NB gateway to delete the charging policy information of the terminal;

the local gateway and/or the H(e)NB gateway deletes the charging policy information of the corresponding terminal according to the notification of the mobility management network element.

In this embodiment, the charging policy information can include but not limit to any one or more of the following information:
offline and/or online charging information;
charging granularity (including: flow and/or duration);
charging rate, and the like.

In the practical application, other information can also be included as needed.

In this embodiment, the step of the mobility management network element obtaining the charging policy information corresponding to the identification from the user subscription data network element can specifically include the following steps of:

performing a security authentication between the mobility management network element and the user subscription data network element, and after the authentication succeeds, sending an updating location message to the user subscription data network element, wherein the updating location message carries the identification and requests the charging policy information corresponding to the identification;

the user subscription data network element querying the charging policy information corresponding to the identification in the stored charging policy information, and returning a response message carrying the charging policy information to the mobility management network element.

The embodiment will be further described by several application examples in the following.

Application example 4, the mobility management network element is the MME.

When the UE attaches to an evolved packet core (EPC) network, and after the security authentication is completed, the MME can obtain the user subscribed charging policy information from the user subscription data network element, wherein the information includes related charging policy information such as: the offline and/or online charging information, the charging granularity (including: flow and/or duration) and the charging rate, and so on.

The local gateway and/or the H(e)NB gateway request(s) to obtain the charging policy information from the MME, and after the local gateway and/or the H(e)NB gateway receives the charging policy information, installs and charges correspondingly for the subsequent services of the UE.

Figure 6:
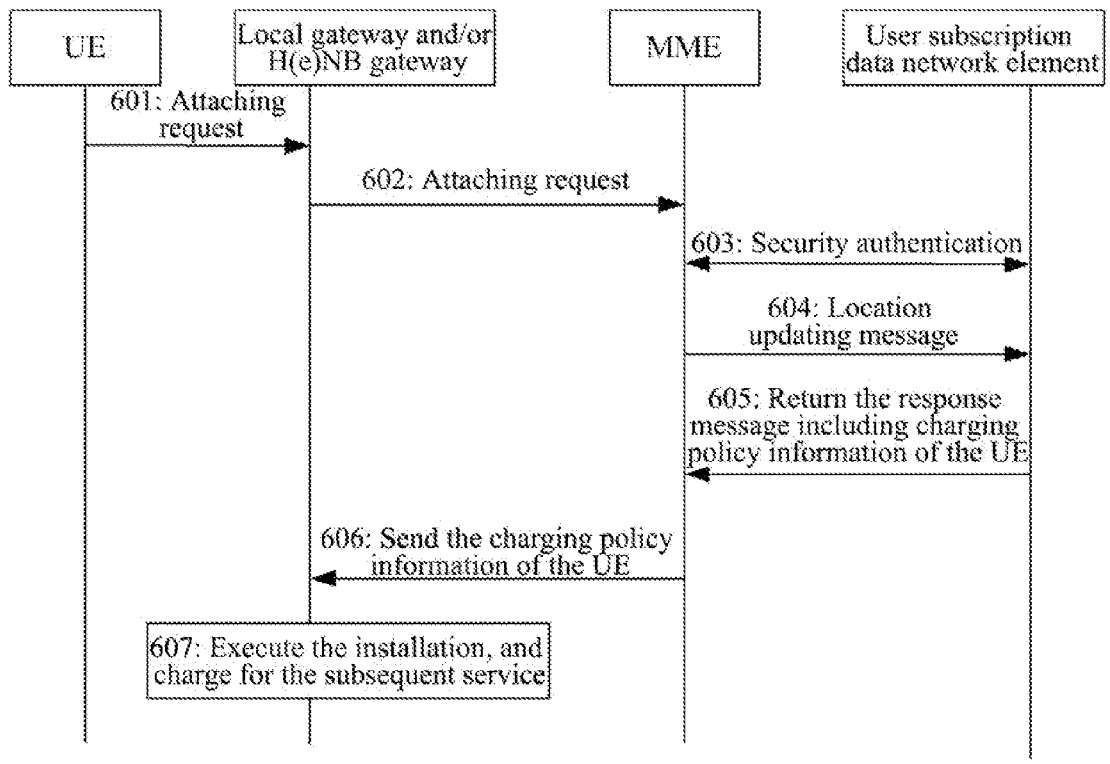
FIG. 6 is a flowchart of application example 4.

The specific steps are shown in FIG. 6:

601, the UE attaches to the EPC network and initiates the attaching request carrying the identification of the UE to the local gateway and/or the H(e)NB gateway;

602, the local gateway and/or the H(e)NB gateway initiate(s) the attaching request carrying the identification of the UE to the MME;

603, the MME initiates the security authentication to the user subscription data network element regarding to the validity of the UE accessing the EPC network.

604, after the security authentication is valid, the MME initiates the location updating message to the user subscription data network element, wherein the message includes the request for the charging policy information of the UE.

605, the user subscription data network element returns the response message to the MME, wherein the response message carries the user subscribed charging policy information of the UE, including related charging policy information such as: the offline and/or online charging information, the charging granularity (including: flow and/or duration), the charging rate, and so on.

606, the MME sends the charging policy information of the UE to the local gateway and/or the H(e)NB gateway, wherein the information includes the related charging policy information such as: the offline and/or online charging information, the charging granularity (including: flow and/or duration), the charging rate, and so on.

607, the local gateway and/or the H(e)NB gateway, after receiving, install(s) the charging policy information, and realize(s) the corresponding charging for the subsequent services of the UE.

Application example 5, the local gateway and/or the H(e)NB gateway is the local gateway and/or the H(e)NB gateway, the mobility management network element is the MME, in this example.

When the MME acquires that some one or more charging policy information change (which can be from a notification of the user subscription data network element, or can be acquired by actively querying or other ways), the MME sends the updating request message to the local gateway and/or the H(e)NB gateway, wherein the updating request message carries the updated charging policy information including the related charging policy information such as: the offline and/or online charging information, the charging granularity (including flow and/or duration) and the charging rate, and so on.

The local gateway and/or the H(e)NB gateway, after receiving the updating request message, returns the response message to the MME, installs the updated charging policy information, and charges correspondingly for the subsequent services.

Figure 7:
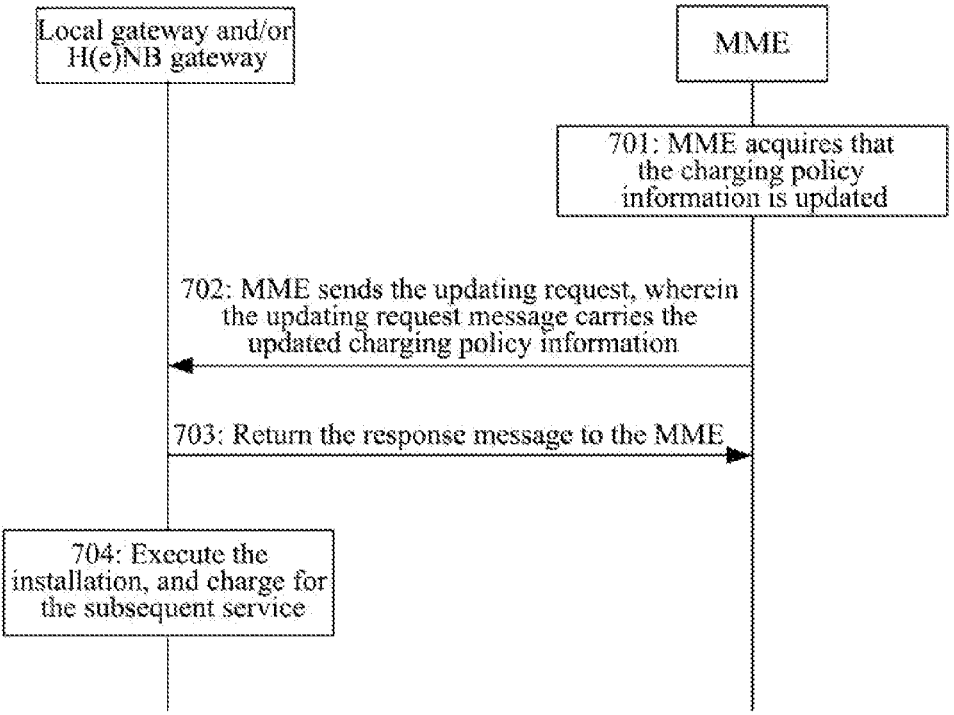
FIG. 7 is a flowchart of application example 5.

The specific steps are shown in FIG. 7:

701, the MME acquires that the related charging policy which the user subscribes changes (probably from the notification of the user subscription data network element);

702, the MME sends the updating request to the local gateway and/or the H(e)NB gateway, wherein the updating request message carries the updated charging policy information, including the related charging policy information such as: the offline and/or online charging information, the charging granularity (including: flow and/or duration) and the charging rate, and the like; and carries the identification of the terminal corresponding to the updated charging policy information;

703, the local gateway and/or the H(e)NB gateway, after receiving the updating request message, return(s) the response message to the MME;

704, the local gateway and/or the H(e)NB gateway install(s) the updated charging policy information, and charge(s) correspondingly for the subsequent services of the corresponding terminal according to the updated charging policy information.

Application example 6, the local gateway and/or the H(e)NB gateway is the local gateway and/or the H(e)NB gateway, the mobility management network element is the MME, in this example.

When the MME acquires that a certain UE leaves from the local gateway and/or the H(e)NB gateway (for example, the cases of switching between the base stations or leaving the network, and so on), the MME notifies the local gateway and/or the H(e)NB gateway to delete the charging policy information corresponding to the UE, the local gateway and/or the H(e)NB gateway, after receiving the message, deletes the charging policy information of the UE installed locally, and returns the response message to the MME.

Figure 8:
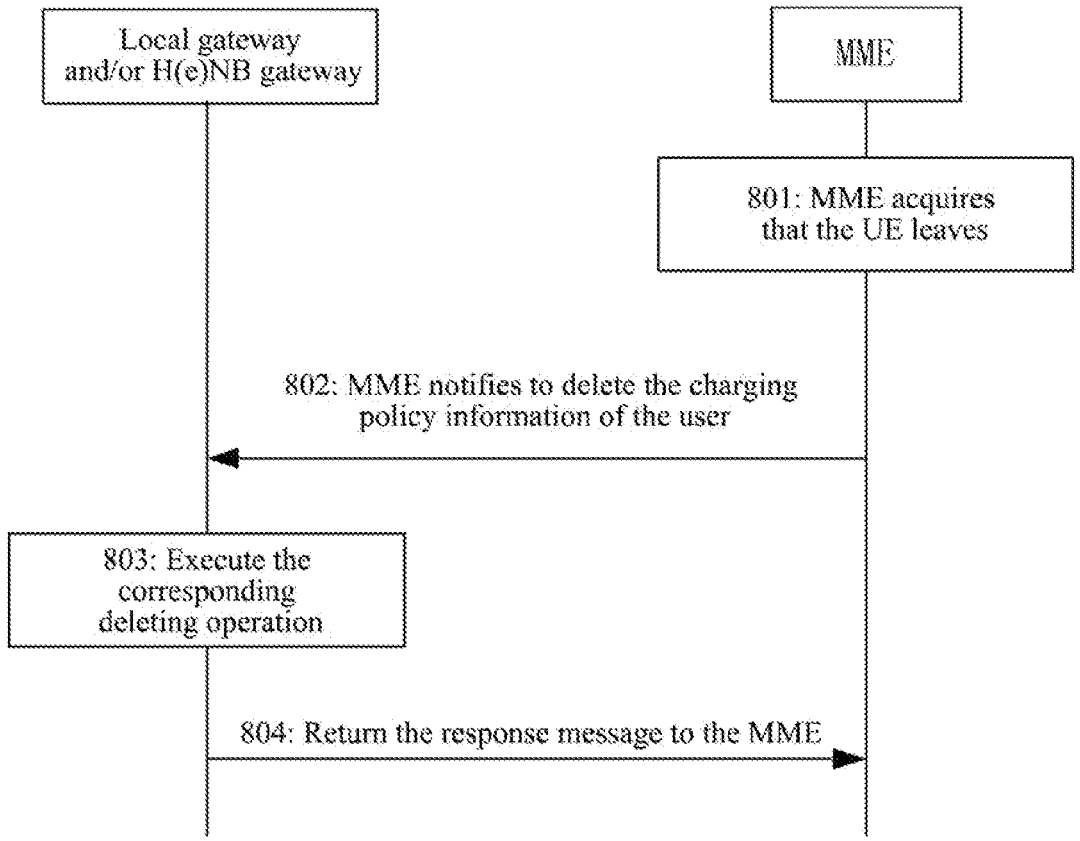
FIG. 8 is a flowchart of application example 6.

The specific steps are as shown in FIG. 8:

801, the MME acquires that a certain UE leaves from the local gateway and/or the H(e)NB gateway (e.g., the cases of switching between the base stations or leaving the network, and so on);

802, the MME notifies the local gateway and/or the H(e)NB gateway to delete the charging policy information of the UE;

803, the local gateway and/or the H(e)NB gateway, after receiving the message, deletes the locally installed charging policy information of the UE;

804, the local gateway and/or the H(e)NB gateway returns the response message to the MME.

Figure 10:
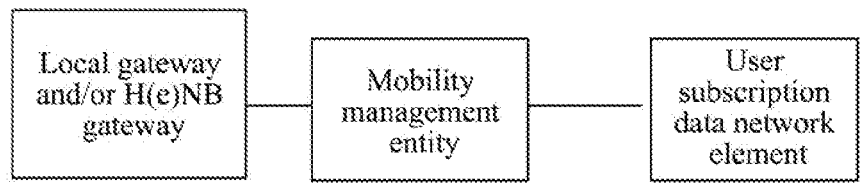
FIG. 10 is a schematic diagram 2 of a charging system.

Embodiment 4, a charging system, as shown in FIG. 10, comprises:

a user subscription data network element, which is configured to: store charging policy information;

a mobility management network element, which is configured to: when receiving an attaching request initiated by a local gateway and/or a H(e)NB gateway, obtain from the attaching request an identification of the terminal which initiates the attaching request to the local gateway and/or the H(e)NB gateway, and then obtain the charging policy information corresponding to the identification from the user subscription data network element, and issue it to the local gateway and/or the H(e)NB gateway; and the local gateway and/or the H(e)NB gateway, which is configured to: send the attaching request to the mobility management network element, receive the charging policy information and store as the charging policy information corresponding to the terminal; and charge correspondingly for the subsequent services of the terminal according to the charging policy information.

In this embodiment, the mobility management network element is further configured to: when the charging policy information is updated, send an updating request message to the local gateway and/or the H(e)NB gateway, wherein the updating request message carries the updated charging policy information and the identification of the terminal corresponding to the updated charging policy information;

accordingly, the local gateway and/or the H(e)NB gateway is further configured to: after receiving the updating request message, update the locally stored charging policy information of the corresponding terminal by the updated charging policy information, and charge for the subsequent services of the corresponding terminal according to the updated charging policy information.

In this embodiment, the mobility management network element can be configured to: update the charging policy information according to its own configuration, or the user subscription data network element can be configured to: notify the mobility management network element to update the charging policy information after updating the charging policy information according to the user subscription information or configuration.

In this embodiment, the mobility management network element is further configured to: when a terminal leaves the local gateway and/or the H(e)NB gateway, notify the local gateway and/or the H(e)NB gateway to delete the charging policy information of the terminal;

the local gateway and/or the H(e)NB gateway is further configured to: delete the charging policy information of the corresponding terminals according to the notification of the mobility management network element.

In this embodiment, the charging policy information can include but not limit to any one or more of the following information:

offline and/or online charging information;
charging granularity (including: flow and/or duration);
charging rate, and so on.

In the practical application, other information can also be included as needed.

In this embodiment, the mobility management network element is configured to obtain the charging policy information corresponding to the identification from the user subscription data network element according to the following way of:

performing a security authentication between the mobility management network element and the user subscription data network element, and after the authentication succeeds, sending an updating location message to the user subscription data network element, wherein the updating location message carries the identification and requests the charging policy information corresponding to the identification; and receiving a response message carrying the charging policy information corresponding to the identification returned by the user subscription data network element;

the user subscription data network element is further configured to: query the charging policy information corresponding to the identification in the stored charging policy information, and return the response message carrying the charging policy information to the mobility management network element.

Of course, the present invention can have other various embodiments, those skilled in the art can make various corresponding changes and variations according to the present invention without departing from the spirit and essential of the present invention, while these corresponding changes and variations should fall into the protection scope of the claims of the present invention.

Industrial Applicability

The technical scheme of the present invention can issue the charging policy information to the radio side network element in the LIPA architecture, thereby realizing dynamic charging based on users or services; and is able to cover the LTE network and the 3G network at the same time.

What is claimed is:

1. A charging method, comprising:
a mobility management network element obtaining charging policy information of a terminal from a user subscription data network element with following process steps:
performing a security authentication between the mobility management network element and the user subscription data network element, and after the authentication succeeds, the mobility management network element sending an updating location message to the user subscription data network element, wherein the updating location message carries the identification of the terminal and requests the charging policy information of the terminal;
the user subscription data network element querying the charging policy information of the terminal in the stored charging policy information, and returning a response message carrying the charging policy information to the mobility management network element;
an access network element obtaining the charging policy information of the terminal from the mobility management network element; and
the access network element storing the charging policy information of the terminal, and charging for services of the terminal according to the charging policy information.

2. The method according to claim 1, wherein,
the access network element is one or more of: a radio side network element, a home eNodeB gateway and a local gateway;

the mobility management network element is one of: a mobility management entity (MME), a mobile switching centre and a serving general packet radio service (GPRS) support node (SGSN); and the user subscription data network element is one of: a home subscriber server (HSS), a subscription profile repository (SPR) and a home location register (HLR).

3. The method according to claim 2, wherein, when the access network element includes the radio side network element and the local gateway, and the radio side network element and the local gateway are deployed separately, the local gateway receives and stores the charging policy information of the terminal, and charges for the services of the terminal according to the charging policy information; wherein, the local gateway is a data distribution function entity.

4. The method according to claim 2, wherein, the radio side network element is one or more of: a base station, a home eNodeB and a radio network controller (RNC); and the local gateway is one or more of: a local serving gateway (L-SGW), a local packet data network gateway (L-PGW) and a data distribution function entity.

5. The method according to claim 2, wherein, before the step of the mobility management network element obtaining the charging policy information of the terminal, the method further comprises:

the mobility management network element, when receiving an attaching request initiated by the access network element, obtaining from the attaching request an identification of the terminal which initiates the attaching request to the access network element; and in the step of the mobility management network element obtaining the charging policy information of the terminal, the mobility management network element obtains the charging policy information corresponding to the identification.

6. The method according to claim 1, wherein, before the step of the mobility management network element obtaining the charging policy information of the terminal, the method further comprises:

the mobility management network element, when receiving an attaching request initiated by the access network element, obtaining from the attaching request an identification of the terminal which initiates the attaching request to the access network element; and in the step of the mobility management network element obtaining the charging policy information of the terminal, the mobility management network element obtains the charging policy information corresponding to the identification.

7. The method according to claim 1, further comprising:

when the charging policy information is updated, the mobility management network element sending an updating request message to the access network element, wherein the updating request message carries an updated charging policy information and an identification of the terminal corresponding to the updated charging policy information;

after the access network element receives the updating request message, updating the locally stored charging policy information of the terminal by the updated charging policy information.

8. The method according to claim 1, further comprising:

when a terminal leaves the access network element, the mobility management network element notifying the access network element to delete the charging policy information of the leaving terminal;

the access network element deleting the charging policy information of the leaving terminal according to the notification of the mobility management network element.

9. The method according to claim 1, wherein the charging policy information is one or more of: offline charging information, online charging information, charging granularity and charging rate.

10. A charging system, comprising: an access network element, a mobility management network element and a user subscription data network element; wherein, the user subscription data network element is configured to: store charging policy information of a terminal;

the mobility management network element is configured to: obtain the charging policy information of the terminal from the user subscription data network element, and send the obtained charging policy information to the access network element;

wherein, the mobility management network element obtaining the charging policy information of the terminal from the user subscription data network element with following process steps:

performing a security authentication between the mobility management network element and the user subscription data network element, and after the authentication succeeds, sending an updating location message to the user subscription data network element, wherein the updating location message carries the identification and requests the charging policy information corresponding to the identification;

the user subscription data network element is configured to: perform the security authentication with the mobility management network element, and after the authentication succeeds, query the charging policy information corresponding to the identification in the stored charging policy information; and the access network element is configured to: obtain the charging policy information of the terminal from the mobility management network element, store the charging policy information of the terminal, and charge for services of the terminal according to the charging policy information.

11. The charging system according to claim 10, wherein:

the access network element is one or more of: a radio side network element, a home eNodeB gateway and a local gateway;

the mobility management network element is one of: a mobility management entity (MME), a mobile switching centre and a serving general packet radio service (GPRS) support node (SGSN);

the user subscription data network element is one of: a home subscriber server (HSS), a subscription profile repository and a home location register (HLR); and the charging policy information is one or more of: offline charging information, online charging information, charging granularity and charging rate.

12. The charging system according to claim 11, wherein, the radio side network element comprises one or more of: a base station, a home eNodeB and a radio network controller (RNC), and the local gateway is one or more of: a local serving gateway (L-SGW), a local packet data network gateway (L-PGW) and a data distribution function entity.

13. The charging system according to claim 10, wherein:
the access network element is further configured to: receive an attaching request initiated by the terminal and send the attaching request to the mobility management network element; and
the mobility management network element is further configured to: when receiving the attaching request initiated by the access network element, obtain from the attaching request an identification of the terminal which initiates the attaching request to the access network element, and then obtain the charging policy information corresponding to the identification from the user subscription data network element.

14. The charging system according to claim 10, wherein:
the mobility management network element is further configured to: send an updating request message to the access network element when the charging policy information is updated, wherein the updating request message carries an updated charging policy information and an identification of the terminal corresponding to the updated charging policy information;
the access network element is further configured to: when receiving the updating request message, update the locally stored charging policy information of the terminal by the updated charging policy information.

15. The charging system according to claim 10, wherein:
the mobility management network element is further configured to: when there is a terminal leaving the access network element, notify the access network element to delete the charging policy information of the leaving terminal;
the access network element is further configured to: delete the charging policy information of the leaving terminal according to the notification of the mobility management network element.

16. An access network element, comprising an obtaining module, a storage module and a charging module, wherein:
the obtaining module is configured to: obtain from a mobility management network element charging policy information of a terminal which is obtained from a user subscription data network element by the mobility management network element;
wherein, the mobility management network element obtaining the charging policy information of the terminal from the user subscription data network element with following process steps:
performing a security authentication between the mobility management network element and the user subscription data network element, and after the authentication succeeds, sending an updating location message to the user subscription data network element, wherein the updating location message carries the identification and requests the charging policy information corresponding to the identification;
the user subscription data network element performing the security authentication with the mobility management network element, and after the authentication succeeds, querying the charging policy information corresponding to the identification in the stored charging policy information;
the storage module is configured to: store the charging policy information of the terminal obtained by the obtaining module; and
the charging module is configured to: charge for services of the terminal according to the charging policy information stored in the storage module.

17. The access network element according to claim 16, wherein:
the access network element is one or more of: a radio side network element, a home eNodeB gateway and a local gateway.

18. The access network element according to claim 17, wherein,
the radio side network element is one or more of: a base station, a home eNodeB and a radio network controller (RNC); and
the local gateway is one of more of: a local serving gateway (L-SGW), a local packet data network gateway (L-PGW) and a data distribution function entity.

19. The access network element according to claim 17, wherein:
the obtaining module is further configured to: receive an updating request message sent by the mobility management network element when the charging policy information is updated, and obtain an updated charging policy information carried in the updating request message; and
the storage module is configured to: update the locally stored charging policy information of the terminal by the updated charging policy information.

20. The access network element according to claim 17, wherein, the access network element further comprises:
a notification forwarding module, which is configured to: receive a notification of deleting charging policy information of a leaving terminal sent by the mobility management module when a terminal leaves the access network element, and forward the notification of deleting the charging policy information of the leaving terminal to the storage module; and
the storage module is further configured to: delete the charging policy information of the leaving terminal according to the notification of deleting the charging policy information of the leaving terminal.

21. The access network element according to claim 16, wherein:
the obtaining module is further configured to: receive an updating request message sent by the mobility management network element when the charging policy information is updated, and obtain an updated charging policy information carried in the updating request message; and
the storage module is configured to: update the locally stored charging policy information of the terminal by the updated charging policy information.

22. The access network element according to claim 16, wherein, the access network element further comprises:
a notification forwarding module, which is configured to: receive a notification of deleting charging policy information of a leaving terminal sent by the mobility management module when a terminal leaves the access network element, and forward the notification of deleting the charging policy information of the leaving terminal to the storage module; and
the storage module is further configured to: delete the charging policy information of the leaving terminal according to the notification of deleting the charging policy information of the leaving terminal.

23. A mobility management network element, comprising a charging policy information obtaining module and a sending module, wherein,
the charging policy information obtaining module is configured to: obtain charging policy information of a terminal from a user subscription data network element with following process steps:

performing a security authentication between the mobility management network element and the user subscription data network element, and after the authentication succeeds, sending an updating location message to the user subscription data network element, wherein the updating location message carries the identification and requests the charging policy information corresponding to the identification; and receiving the charging policy information corresponding to the identification returned by the user subscription data network element; and the sending module is configured to: send the obtained charging policy information to an access network element, so that the access network element obtains from the mobility management network element and stores the charging policy information of the terminal, and charges for services of the terminal according to the charging policy information.

24. The mobility management network element according to claim 23, wherein:

the mobility management network element is one of: a mobility management entity (MME), a mobile switching centre and a serving general packet radio service (GPRS) support node (SGSN).

25. The mobility management network element according to claim 24, wherein:

the charging policy information obtaining module is further configured to: when receiving an attaching request which is initiated by the terminal and sent by the access network element, obtain from the attaching request an identification of the terminal which initiates an attaching request to the access network element, and obtain the charging policy information corresponding to the identification from the user subscription data network element.

26. The mobility management network element according to claim 24, wherein:

the charging policy information obtaining module is further configured to: when the charging policy information is updated, send an updating request message to the access network element, wherein the updating request message carries an updated charging policy information and an identification of the terminal corresponding to the updated charging policy information, so that the access network element updates the locally stored charging policy information of the terminal by the updated charging policy information.

27. The mobility management network element according to claim 24, wherein:

the charging policy information obtaining module is further configured to: when a terminal leaves the access network element, notify the access network element to delete the charging policy information of the leaving terminal, so that the access network element deletes the charging policy information of the leaving terminal according to the notification of the mobility management network element.

28. The mobility management network element according to claim 23, wherein:

the charging policy information obtaining module is further configured to: when receiving an attaching request which is initiated by the terminal and sent by the access network element, obtain from the attaching request an identification of the terminal which initiates an attaching request to the access network element, and obtain the charging policy information corresponding to the identification from the user subscription data network element.

29. The mobility management network element according to claim 23, wherein:

the charging policy information obtaining module is further configured to: when the charging policy information is updated, send an updating request message to the access network element, wherein the updating request message carries an updated charging policy information and an identification of the terminal corresponding to the updated charging policy information, so that the access network element updates the locally stored charging policy information of the terminal by the updated charging policy information.

30. The mobility management network element according to claim 23, wherein:

the charging policy information obtaining module is further configured to: when a terminal leaves the access network element, notify the access network element to delete the charging policy information of the leaving terminal, so that the access network element deletes the charging policy information of the leaving terminal according to the notification of the mobility management network element.

* * * * *